United States Patent [19]

Belanger

[11] Patent Number: 5,513,727
[45] Date of Patent: May 7, 1996

[54] CIRCUMFERENTIAL CHOCK WITH LOCKABLE, CONCAVE CLAMPING JAWS

[76] Inventor: Michael Belanger, 157 Bedford Rd., Lincoln, Mass. 01773

[21] Appl. No.: 449,848

[22] Filed: May 24, 1995

Related U.S. Application Data

[63] Continuation of Ser. No. 59,934, May 11, 1993, abandoned.

[51] Int. Cl.$^6$ .................................................. B60T 3/00
[52] U.S. Cl. ........................................................ 188/32
[58] Field of Search ............................... 188/1.12, 5, 19, 188/28, 32, 36, 56, 4 R, 4 B; D12/217; 410/30, 49, 50

[56] References Cited

U.S. PATENT DOCUMENTS

| | | | |
|---|---|---|---|
| 1,101,883 | 6/1914 | Rochford | 188/4 R X |
| 2,850,117 | 9/1958 | Gersmehl, Sr. | 188/32 |
| 2,954,101 | 9/1960 | Corson | 188/32 |
| 3,120,292 | 2/1964 | Rambat | 188/32 |
| 3,258,088 | 6/1966 | Bowen | 188/32 |
| 3,301,352 | 1/1967 | Corson | 188/32 |
| 3,734,241 | 5/1973 | Hale | 188/32 |
| 4,441,586 | 4/1984 | Bernier | 188/32 |
| 4,804,070 | 2/1989 | Bohler | 188/32 |

FOREIGN PATENT DOCUMENTS

| | | | |
|---|---|---|---|
| 2048257 | 2/1993 | Canada | 188/32 |

*Primary Examiner*—Josie Ballato
*Attorney, Agent, or Firm*—Iandiorio & Teska

[57] ABSTRACT

A circumferential chock including opposing jaw members each having a chocking wall for engaging a wheel integrally joined by a hinge for providing movement of the jaw members in relation to each other between an open position for receiving a wheel and a substantially closed position circumferentially engaging the chocking walls with the wheel for braking a wheel against rolling, swivelling, and sliding.

11 Claims, 5 Drawing Sheets

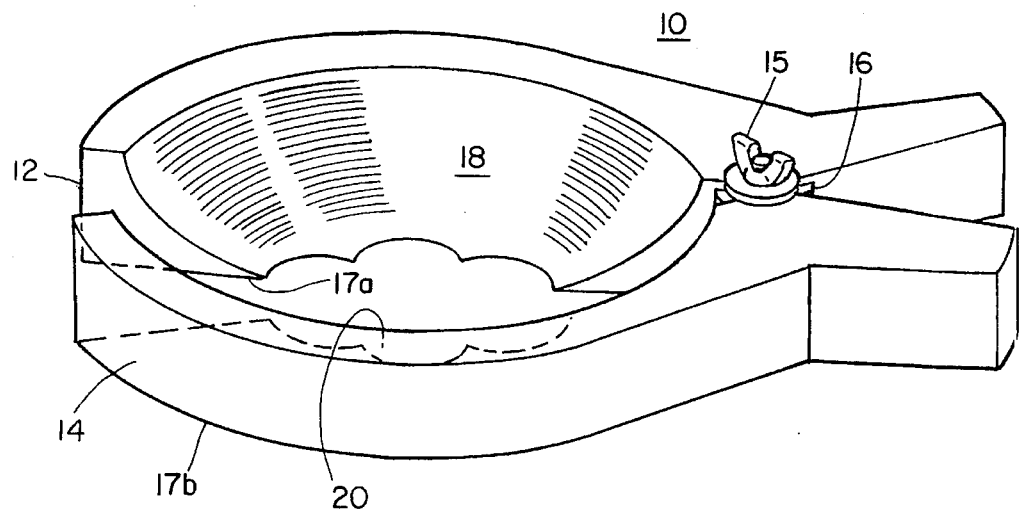
FIG. 1
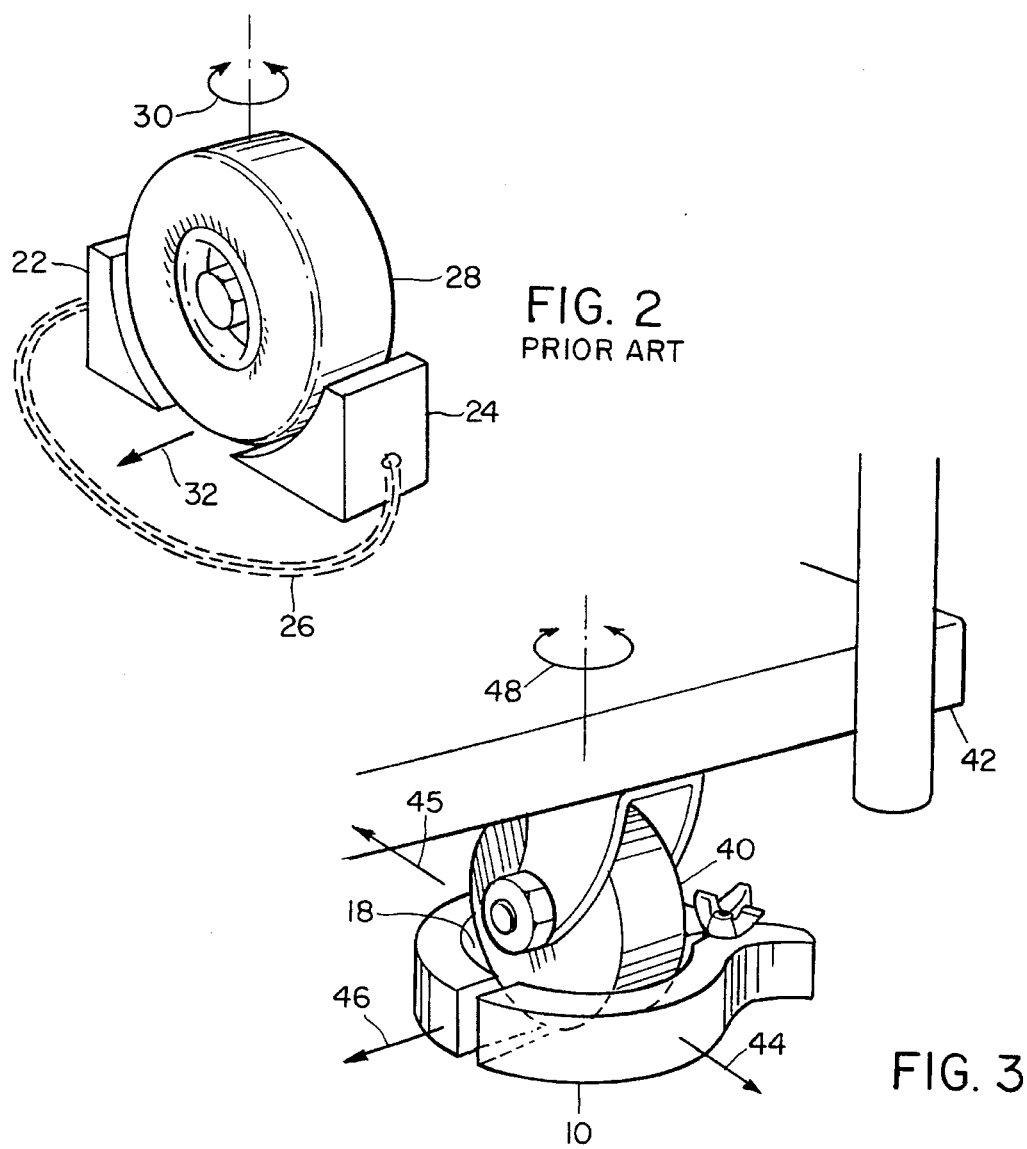
FIG. 2
PRIOR ART
FIG. 3

CIRCUMFERENTIAL CHOCK WITH LOCKABLE, CONCAVE CLAMPING JAWS

This is a continuation of application Ser. No. 08/059,934, filed May 11, 1993, now abandoned.

FIELD OF INVENTION

This invention relates to a circumferential chock for wheeled vehicles and the like.

BACKGROUND OF INVENTION

Wheeled vehicles must often be immobilized or otherwise secured for a time in order to off-load cargo from the vehicle, or during transport of the vehicle itself. For example, tray and tote carts, hopper trucks, laundry bins, pallet trucks, and portable garment racks include casters or wheels which must be chocked while the cargo or equipment is being loaded, held in waiting or removed. Rolling ladders may include two swivel casters and two rigid casters each having locks to prevent rolling, but chocking may still be necessary to prevent rotation or sliding of the individual casters on the floor. Blocking the casters or wheels of such vehicles against rolling, sliding, and/or rotation may also be necessary during air or ground transport of the carts or trucks, during docking operations, or during work stoppage when the vehicle is on a skid platform, ramp, or lift.

Chocking operations are considered critical from a safety stand point and OSHA has set forth requirements for chocks and chocking operations. In addition to human safety considerations, chocking operations are often necessary to prevent damage to the cargo being transported, damage to the transport vehicle itself, and damage to other stock or workers in the area. Because of their size, tire chocks are generally unsuitable for blocking casters—especially those which swivel. Moreover, blocking the wheel against rolling action requires two conventional chocks, one on each side of the tire. A security chain may be employed to prevent loss or misplacement of the chocks, but in general, employment of such chocks can be an unwieldy and time consuming operation since each chock must be firmly wedged against the tire. In addition, although some of the more expensive casters may have locks which prevent rolling and even rotation, chocking operations may still be required to prevent sliding.

Unfortunately, there are no chock devices which work well on casters, wheels, and tires; nor are there chock devices which block swiveling casters and wheels against rotation, or which block wheels against both rolling and sliding.

SUMMARY OF INVENTION

It is therefore an object of this invention to provide a circumferential chock which can be employed with a variety of sizes of casters, wheels, and tires.

It is a further object of this invention to provide such a circumferential chock which both prevents rolling and swiveling or rotation movement of the caster or wheel.

It is a further object of this invention to provide such a circumferential chock which eliminates the need for separate chained linked chocks to control rolling movement.

It is a further object of this invention to provide such a circumferential chock which eliminates the need to firmly wedge the individual chocks against the tire to be blocked.

It is a further object of this invention to provide such a circumferential chock which eliminates the need to use casters or wheels which incorporate locking mechanisms and which assure that even these types of locking casters or wheels can be fully immobilized against movement in all directions.

This invention results from the realization that locking a wheel against both rolling and swiveling movement can be effectuated by a circumferential chock in which integrally hinged jaw members each having a chocking wall open to receive the wheel and also close substantially around the wheel to capture the wheel and prevent movement in all directions including rolling, swiveling, and sliding.

This invention features a circumferential chock in which opposing jaw members each having a chocking wall for engaging a wheel are integrally joined and are able to move between an open position for receiving a wheel and a substantially closed position circumferentially engaging the chocking walls with the wheel for braking the wheel against rolling, swiveling, and sliding. There may be two jaw members joined by a single hinge at one end, or three or more jaw members joined together by a plurality of hinges. In an optimal embodiment, each jaw member is concave and the chocking wall has a sloping concave face. A cut-out portion may be included in the chocking wall for accommodating lower most portion of the wheel in contact with the floor to prevent swivelling. Furthermore each jaw member may include a lever portion for maneuvering the jaw members between the open and closed positions. There may be one or more control mechanisms adjusting the jaw members and for locking the jaw members in a variety of positions. There may also be means for resiliently biasing the jaw members and for urging them to the closed position.

In one embodiment, the jaw members include a plurality of fixed individual layers one edge of which forms the chocking wall; in another embodiment the individual layers are slidable and may include resilient biasing means for independently engaging one or more of the layers along the curvature of the wheel. The edges may be beveled to form a smooth chocking wall, or off-set to form a gripping chocking wall. The biasing means for the layers may be springs or elastomeric materials of different stiffness for providing firm engagement along one portion of the wheel and a more relaxed engagement along another portion of the wheel.

In another embodiment, the jaw members may include a plurality of individually hinged tabs segments for conforming the circumferential chock circumferentially about the wheel. In another embodiment, the jaw members may be joined by a linkage system such as a four-bar link for providing relative parallel movement of the opposing jaw members.

In still another embodiment, there are chocking members for engaging the sides of a wheel for blocking the wheel against pivoting, and barricade means, integral with the chocking members, for blocking the wheel against rolling. The barricade means may include a sloping wall positioned between the chocking members and also a pivoting member interconnected with one of the chocking members for providing a circumferential enclosure substantially about the wheel.

In any embodiment, the circumferential chock of this invention blocks a caster, wheel, or tire against rolling, swivelling and sliding.

BRIEF DESCRIPTION OF PREFERRED EMBODIMENT

Other objects, features and advantages will occur to those skilled in the art from the following description of a pre-

3 ferred embodiment and the accompanying drawings, in which:

FIG. 1 is a schematic diagram of a circumferential chock according to this invention;

FIG. 2 is a schematic diagram of prior art tire chocks blocking a tire;

FIG. 3 is a schematic diagram of the circumferential chock of FIG. 1 employed with the caster of a hand cart;

DETAILED DESCRIPTION

Figure 12:
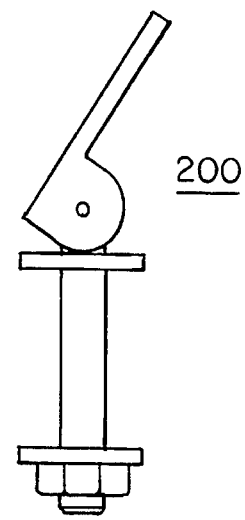
FIG. 12 is a schematic view of a locking clamp which may be incorporated with the hinge mechanism of FIG. 11.

Circumferential chock 10, FIG. 1, according to this invention includes opposing jaw members 12 and 14 integrally joined by hinge 16, more particularly described with reference to FIG. 12. Each jaw 12 and 14 includes base 17a, 17b and a sloping chocking wall 18 and 20, respectively, for engaging a wheel to be circumferentially blocked. Locking clamp 15 allows jaws 18 and 20 to be locked in any position. The jaws 12 and 14 may be biased to automatically come together as more particularly described with reference to FIG. 13.

Prior art chocks 22, and 24, FIG. 2, coupled with security chain 26 may be adequate for large tires, but employed with caster 28 which may swivel in the direction shown by arrow 30, chocks 22 and 24 do not adequately block movement in all directions. Once caster 28 swivels, it may easily roll from between tire chocks 22 and 24. Worse, caster 28 could slide under a heavy load in the direction shown by arrow 32 and conventional chocks 22 and 24 would not prevent such movement. There are even multidirectional rollers employing barrel shaped rollers about the perimeter of the main wheel. Blocking such a roller would require four of these conventional chocks and even then swiveling action would not be stopped completely. And, commercially available chocks for car and truck tires are generally too large and cumbersome for use with wheel carts, trucks, garment racks, and the like.

4

Circumferential chock 10, FIG. 3, however, according to this invention, locks swivelling caster wheel 40 of cart 42 against all movement including rolling in the directions shown by arrows 44 and 45, sliding in the direction shown by arrow 46, and swiveling in the direction shown by arrow 48. Even if caster 40 swivels a small amount, it cannot roll since sloping chocking wall 18 circumferentially engages caster 40. It is not necessary that circumferential chock 10 completely surrounds caster 40 and "circumferentially" as used herein means substantially enclosing the wheel or tire.

Figure 4:
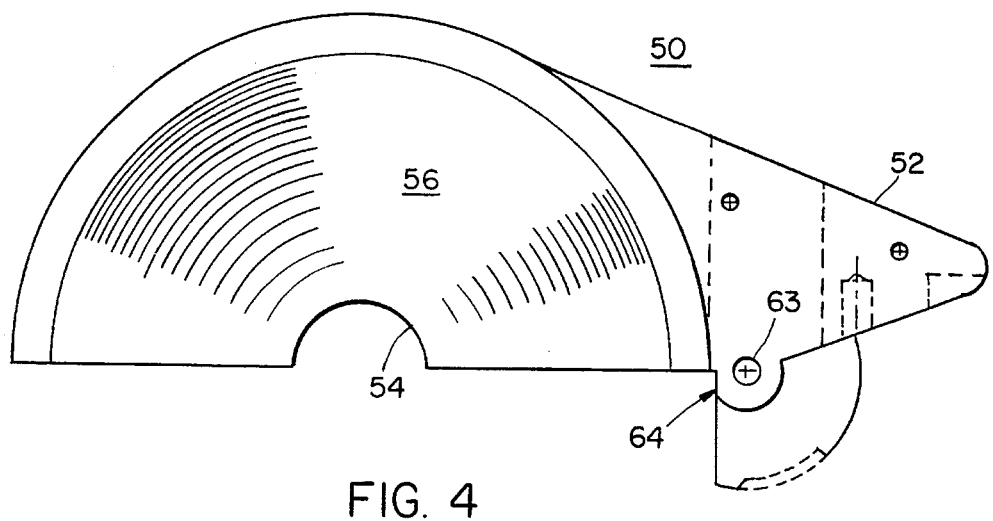
FIG. 4 is a top view of one half of the circumferential chock according to this invention.
Figure 5:
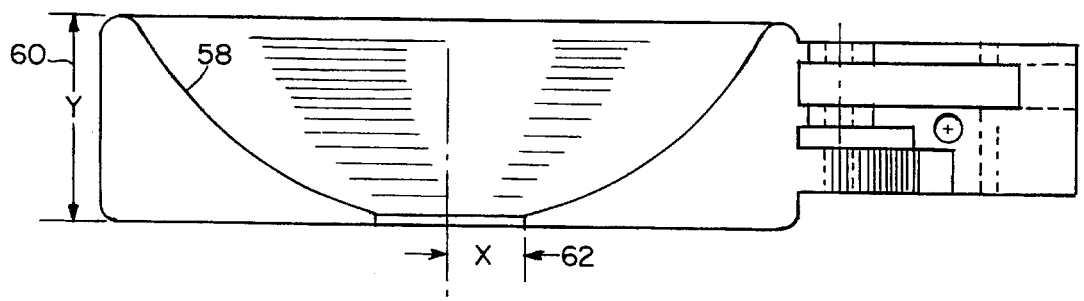
FIG. 5 is a side view of the circumferential chock of FIG. 4.

In one embodiment, each jaw 50, FIG. 4, includes longitudinal flange 52 which forms a lever rotatable about fulcrum point 63 proximate hinge 64 for assisting in maneuvering the jaw members between an open and closed chocking position about the wheel. Cut-out portion 54 receives the lower portion of the wheel in contact with the floor and further engage the jaws with the wheel. Cut-out portion 54 also serves another purpose: when not in use, circumferential chock 10, FIG. 1, can be hung on the handle of a cart or similar bars or rods as the cut-out portion will secure the chock on the handle once wing nut 15 is tightened. Curved chocking wall 56, FIG. 4 has a sloping concave face 58, FIG. 5, which assists in braking the wheel against both rolling and swivelling action. An optimal relationship between the height y, 60, of jaw 50 and the radius x, 62, of cut out portion 54 is:

$$y = \frac{e^x - 1}{5} - .130 \ \{.5 \leqq x \leqq 2.0\}$$

Figure 6:
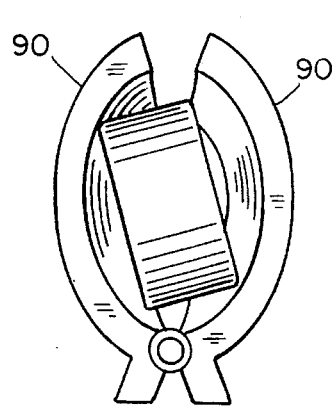
FIG. 6 is a schematic diagram of a circumferential chock according to this invention employing elliptical shaped jaw members.
Figure 7:
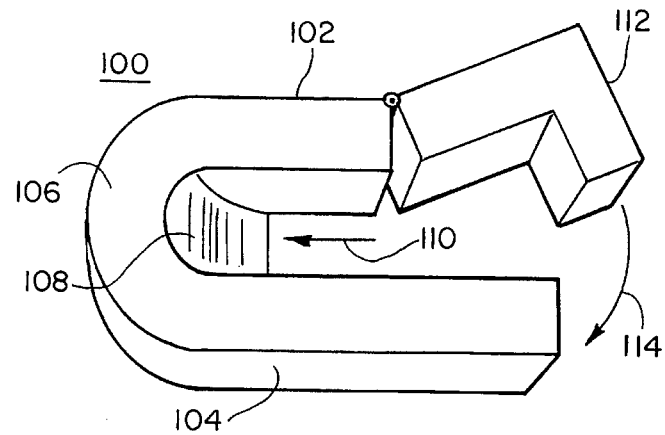
FIG. 7 is a schematic diagram of another embodiment of the circumferential chock according to this invention employing an end-gate.

Although in FIG. 1 the jaws 12 and 14 are circular in shape, this is not a limitation of the present invention. The jaws 90, FIG. 6 may be parabolic or elliptical in shape. Also, the jaws need not be curved, or include sloping chock walls. Circumferential chock 100, FIG. 7, includes opposing chocking members 102 and 104 which limit rotation of a wheel and barricade portion 106 incorporating sloping wall 108 which prevents the wheel from rolling in the direction denoted by arrow 110. Pivoting gate member 112, once rotated in the direction shown by arrow 114, stops rolling in the direction opposite of arrow 110.

Figure 8:
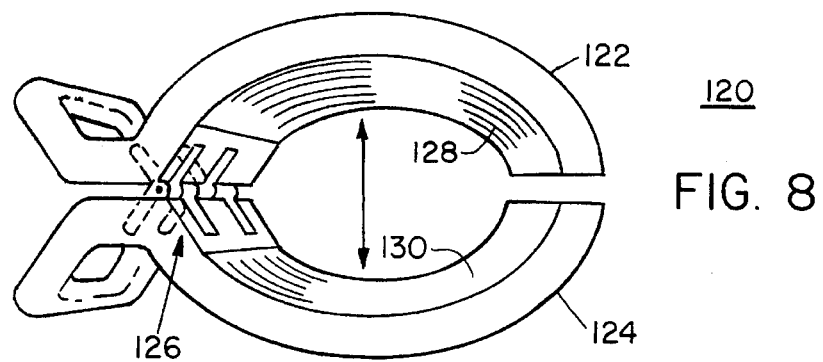
FIG. 8 is a schematic diagram of a circumferential chock according to this invention employing a four-bar linkage.

Circumferential chock 120, FIG. 8, in another embodiment, includes two jaws 122 and 124 interconnected by four bar link mechanism 126 for providing relative parallel movement of opposing chocking walls 128 and 130.

Figure 9:
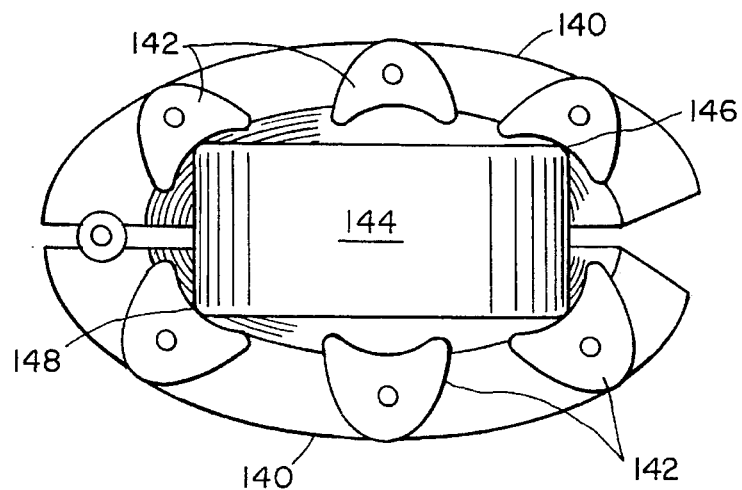
FIG. 9 is a schematic diagram of a circumferential chock according to this invention employing discrete tab segments for contouring circumferentially about the wheel.
Figure 10:
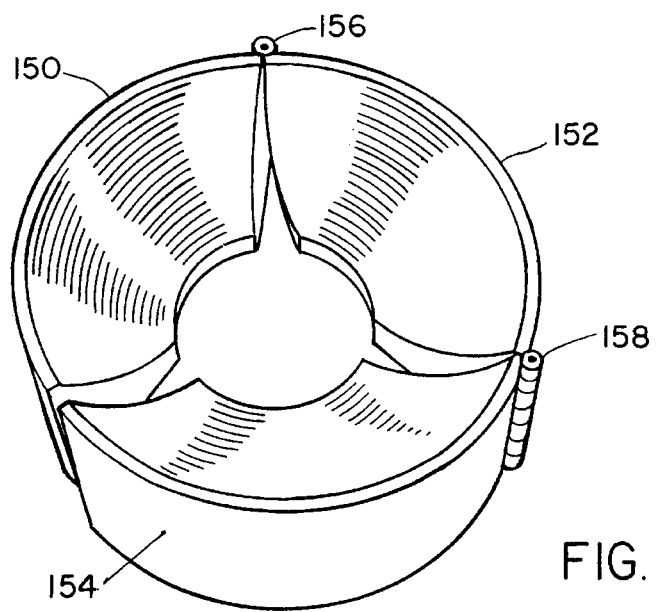
FIG. 10 is a schematic diagram of a circumferential chock according to this invention employing three jaw members.

Jaws 140, FIG. 9, may include pivotable segments or tabs 142 for securely meshing and conforming the jaws about wheel 144 especially at edges 146 and 148. In another embodiment, there are three opposing jaw members 150, 152, and 154, FIG. 10, joined by hinges 156 and 158. As used herein, "opposing" does not necessarily mean diametrically opposed. When jaw 152 is firmly slid up against a caster or tire, there will be a tendency for jaws 150 and 154 to collapse about and surround the wheel.

Figure 11:
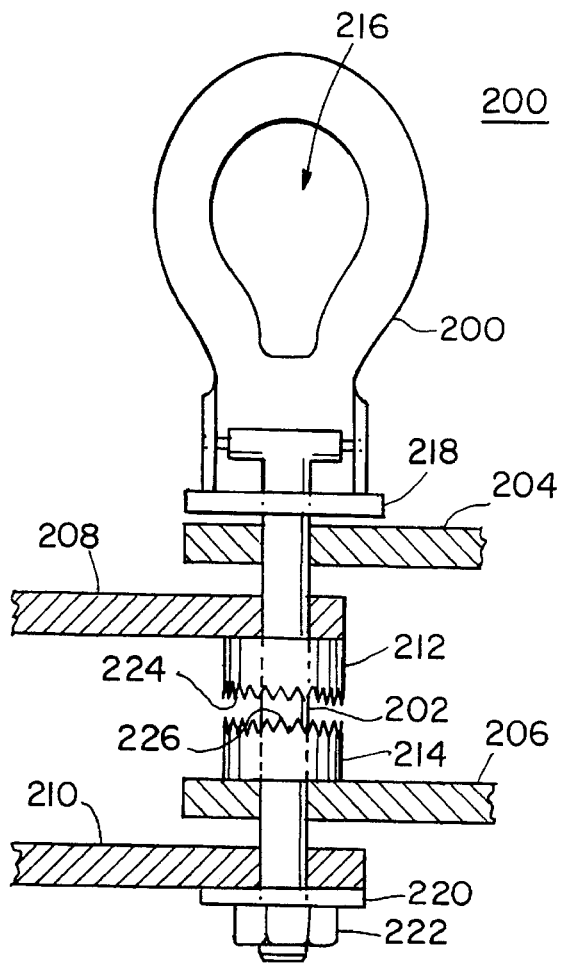
FIG. 11 is a partial schematic view of a hinge mechanism that may be employed with the circumferential chock of this invention.

There are a variety of hinge mechanisms that may be employed to integrally joint jaw members 12 and 14, FIG. 1. As shown in FIG. 11, hinge assembly includes "snap-tite" locking clamp 200, bolt 202 of which extends through layers 204 and 206 extending from the first jaw member at the hinge region and layers 208 and 210 extending from the second jaw member. As shown, layers 204 and 206 are interleaved with layers 208 and 210.

Ridged washer 212 is affixed to layer 208 and ridged washer 214 is affixed to layer 206. In this way, when clamp 200 is rotated downward in the direction shown by arrow 216, it biases washer 218 towards washer 220 (bolt 202 terminating at nut 222) and teeth 224 of ridged washer 212 mesh with teeth 226 of 214 locking interleaved layers 204, 206, 208 and 210 of the opposing jaw members together thereby securing it about a caster. Locking clamp 200, FIG. 11, is also shown in FIG. 12 for clarity.

Figure 13:
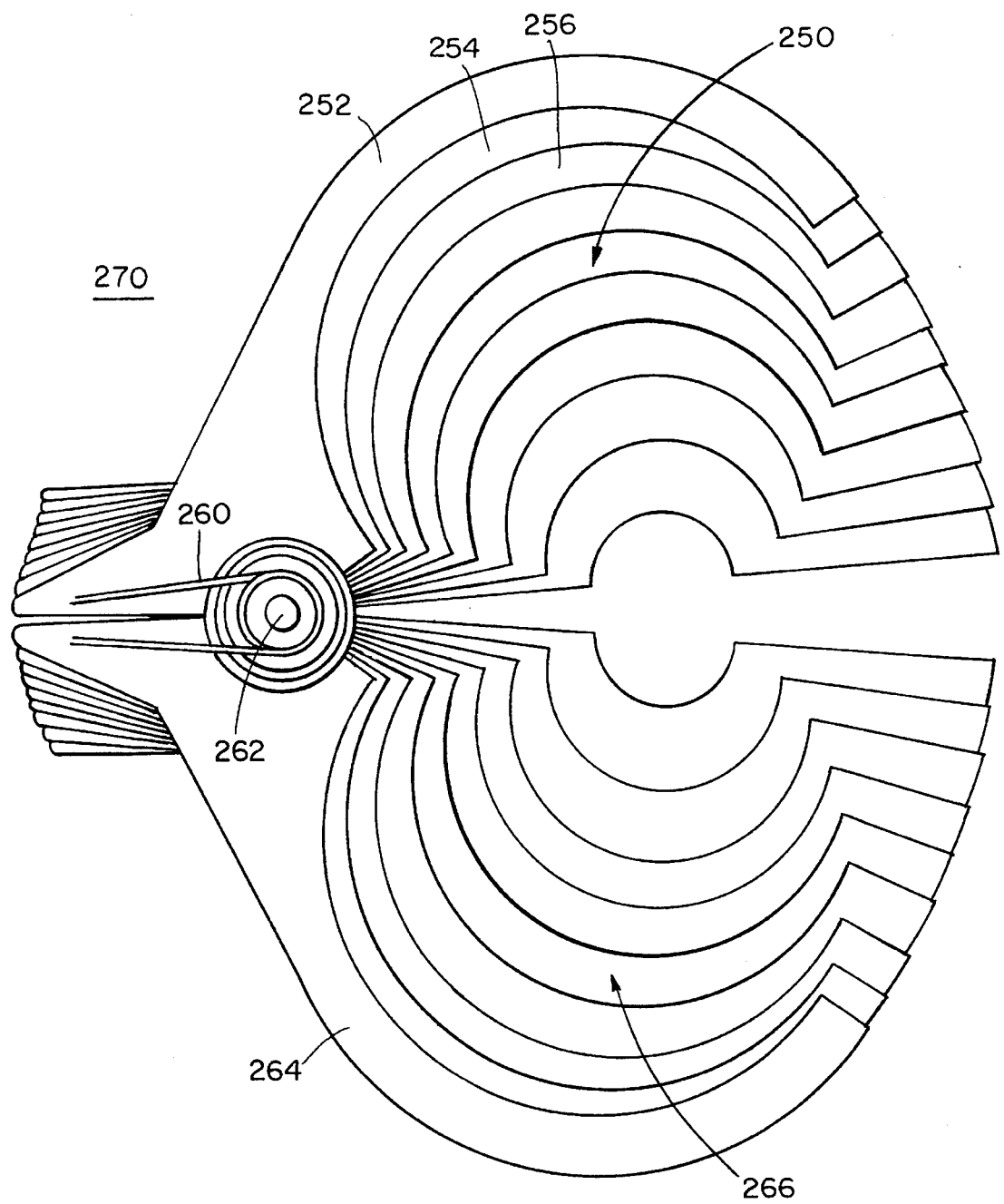
FIG. 13 is a top view of circumferential chock according to this invention employing a number of sliding individually biased layers.

Alternative embodiments include chock wall 270, FIG. 13 built of a plurality of individual layers 252, 254, 256, etc. In one embodiment, one or more of the layers may be individually biased. For example, layer 252 may be biased by spring 260 which is fixed in layer 252, wrapped around hinge 262, and fixed in layer 264 of opposing wall 266. In this way, each layer individually engages with the curvature of the wheel. Moreover, the other springs used to assist biasing individual layers 254,256, etc. (not shown) may be of different stiffness to provide a firm engagement near the bottom of the wheel and a more relaxed engagement at the top of the wheel (or conversely, firm near the top and relaxed near the bottom).

Figure 14:
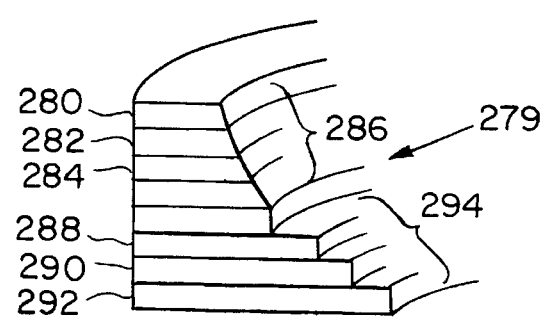
FIG. 14 is a partical schematic edge view of the circumferential chock of FIG. 13 in which the individual layers may be beveled and/or arranged in a step fashion.

Also, the edges of layers 280, 282, 284, FIG. 14, of chock wall 279 may be beveled for a smooth wall configuration or offset and arranged in step fashion as shown at 294 for layers 288, 290, and 292 for increased friction as a wheel tends to roll up wall 279.

Many different materials can be used in the fabrication of the circumferential chock of this invention depending on the manufacturing process used. A high friction material can be added to the base to prevent slippage, and the circumferential chocks can be fabricated in many different sizes to accommodate the smallest of casters to the largest of truck tires. Therefore, "wheel" as used in the following claims should be taken to mean casters of all kinds, hard wheels, tires, and the like.

Therefore, although specific features of the invention are shown in some drawings and not others, this is for convenience only as some feature may be combined with any or all of the other features in accordance with the invention.

And, other embodiments will occur to those skilled in the art and are within the following claims:

What is claimed is:

1. A circumferential chock comprising:

jaw members each having a curved concave chocking wall for engaging a wheel;

hinge means integrally joining said jaw members for providing movement of said jaw members in relation to each other between an open position for receiving the wheel and a closed position circumferentially engaging said chocking walls with the wheel for braking the wheel against rolling and swiveling; and a clamp engaged through said hinge means, said clamp including means for positively but releasably locking said jaw members in said closed position and in a plurality of positions between said closed position and said open position.

2. The circumferential chock of claim 1 in which said jaw members comprise two jaw members joined by a single hinge at one end.

3. The circumferential chock of claim 1 in which said jaw members have a concave base, and a concave chocking wall face.

4. The circumferential chock of claim 3 in which said concave face includes a cutout portion for accommodating the lower portion of a wheel.

5. The circumferential chock of claim 1 in which each said jaw member includes a lever portion for maneuvering said jaw members between said open position and said closed position.

6. The circumferential chock of claim 1 further including a high friction surface on a bottom portion of the chock for preventing the chock from slipping.

7. A circumferential chock comprising:

jaw members each having a curved concave chocking wall for engaging a wheel;

a bottom portion having a high-friction surface for preventing slippage of the chock;

hinge means integrally joining said jaw members for providing movement of said jaw members in relation to each other between an open position for receiving the wheel, and a closed position circumferentially engaging said chocking walls with the wheel for braking the wheel against rolling and swiveling; and a clamp engaged through said hinge means, said clamp including means for positively but releasably locking said jaw members in said closed position and in a plurality of positions intermediate said closed position and said open position.

8. A circumferential chock comprising:

jaw members each having curved concave chocking means having a radius and a slope for engaging a wheel and lever means for maneuvering said jaw members between an open position and a closed position, each said chocking means having a cutout portion for accommodating the lower portion of said wheel;

a bottom portion having means for preventing slippage of the chock;

hinge means integrally joining said jaw members for providing movement of said jaw members in relation to each other between said open position for receiving said wheel and said closed position circumferentially engaging said chocking walls with the wheel for braking said wheel against rolling and swiveling, including means for resiliently biasing said jaw members toward said closed position; and a clamp engaged through said hinge, said clamp including means for positively but releasably locking said jaw members in said closed position, said open position and in a plurality of positions intermediate said closed position and said open position.

9. The circumferential chock of claim 8 wherein the slope of said curved concave chocking means is:

$$y = \frac{e^x - 1}{5} - .130 \{.5 \leq x \leq 2.0\};$$

in which y is the height of said jaw members and x is the radius of said cutout portion.

10. The circumferential chock of claim 8 wherein the slope of said curved concave chocking means is a function of the height of said jaw members and the radius of said cutout portion.

11. The circumferential chock of claim 8 wherein said curved concave chocking means evenly distribute pressure impressed upon them by said wheel across said bottom portion.

* * * * *